United States Patent
Do et al.

(10) Patent No.: US 9,776,645 B2
(45) Date of Patent: Oct. 3, 2017

(54) AIR-CONDITIONING DEVICE FOR A RAILWAY VEHICLE HAVING AT LEAST TWO CARRIAGES

(71) Applicant: ALSTOM TRANSPORT TECHNOLOGIES, Levallois Perret (FR)

(72) Inventors: Huu-Thi Do, Rochefort (FR); Etienne Varin, Lagord (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 237 days.

(21) Appl. No.: 14/662,693

(22) Filed: Mar. 19, 2015

(65) Prior Publication Data
US 2015/0266492 A1 Sep. 24, 2015

(30) Foreign Application Priority Data
Mar. 20, 2014 (FR) .................................. 14 52332

(51) Int. Cl.
B61D 27/00 (2006.01)
B60H 1/26 (2006.01)
F24F 13/02 (2006.01)

(52) U.S. Cl.
CPC ..... *B61D 27/0018* (2013.01); *B61D 27/0072* (2013.01); *Y02T 30/30* (2013.01)

(58) Field of Classification Search
None
See application file for complete search history.

(56) References Cited

U.S. PATENT DOCUMENTS

| | | | | |
|---|---|---|---|---|
| 1,949,640 A | * | 3/1934 | Anderson | F24F 5/0007 261/DIG. 34 |
| 2,005,769 A | * | 6/1935 | Arf | B61D 27/009 105/25.1 |
| 2,009,823 A | * | 7/1935 | Van Vulpen | G05D 23/27539 105/1.1 |
| RE20,178 E | * | 11/1936 | Arf | B61D 27/009 454/112 |
| 2,080,757 A | * | 5/1937 | Blomberg | B61D 27/0036 105/25.1 |
| 2,116,538 A | | 5/1938 | Mussey et al. | |

(Continued)

OTHER PUBLICATIONS

Office Action issued Mar. 20, 2014 in corresponding France application No. 1452332.

*Primary Examiner* — Gregory Huson
*Assistant Examiner* — Eric Gorman
(74) *Attorney, Agent, or Firm* — Knobbe Martens Olson & Bear LLP

(57) ABSTRACT

An air-conditioning device has a duct that emits a flow of conditioned air and at least one circulation circuit intended for fitting out a carriage. The circulation circuit includes an air inlet through which passes an incoming airflow from the duct; at least one conduit for distributing air towards a compartment room, extending between an upstream end and a downstream end, both intended to be laid out in the carriage; a conduit for transferring conditioned air towards another adjacent air circulation circuit, which fits out a carriage adjacent to the first; and means for distributing conditioned air from the air inlet, and distributing the incoming airflow among the distribution and transfer conduits.

12 Claims, 1 Drawing Sheet

(56) References Cited

U.S. PATENT DOCUMENTS

| | | | | | |
|---|---|---|---|---|---|
| 2,246,499 | A | * | 6/1941 | Blomberg | B61D 3/10 105/399 |
| 2,698,569 | A | * | 1/1955 | Reynolds | B60H 1/00371 105/340 |
| 2,760,725 | A | * | 8/1956 | Callender | B61D 27/0018 237/39 |
| 3,108,452 | A | * | 10/1963 | Breen | B61D 27/0081 62/187 |
| 3,343,473 | A | * | 9/1967 | Gillick | B60H 1/00371 165/123 |
| 3,520,355 | A | * | 7/1970 | Rueth | B61D 27/0018 165/42 |
| 4,425,763 | A | * | 1/1984 | Porta | B61C 1/02 105/234 |
| 2007/0283713 | A1 | * | 12/2007 | Masselus | B60L 1/003 62/331 |
| 2016/0144872 | A1 | * | 5/2016 | Meergans | B61D 1/00 52/220.6 |

* cited by examiner

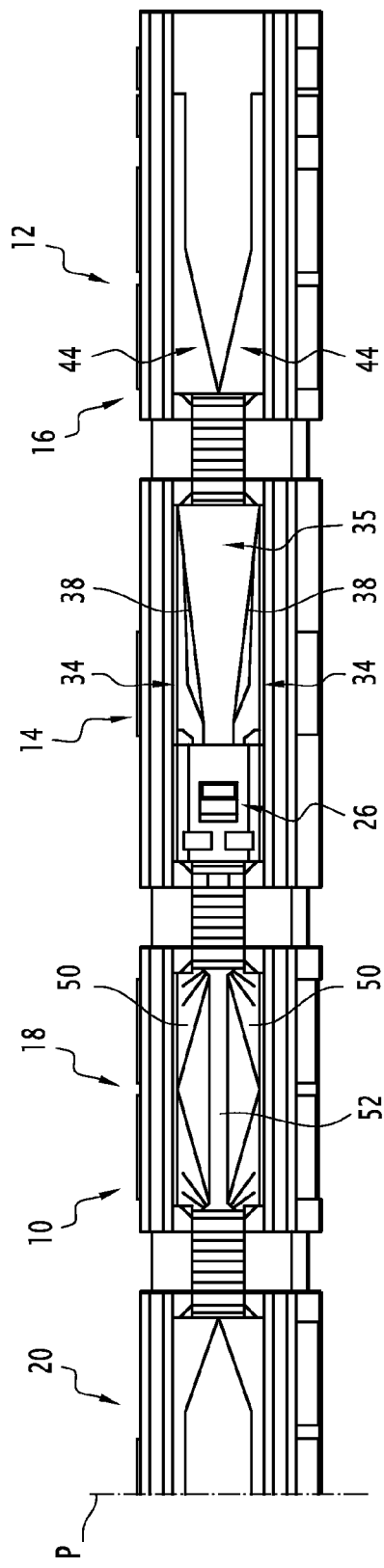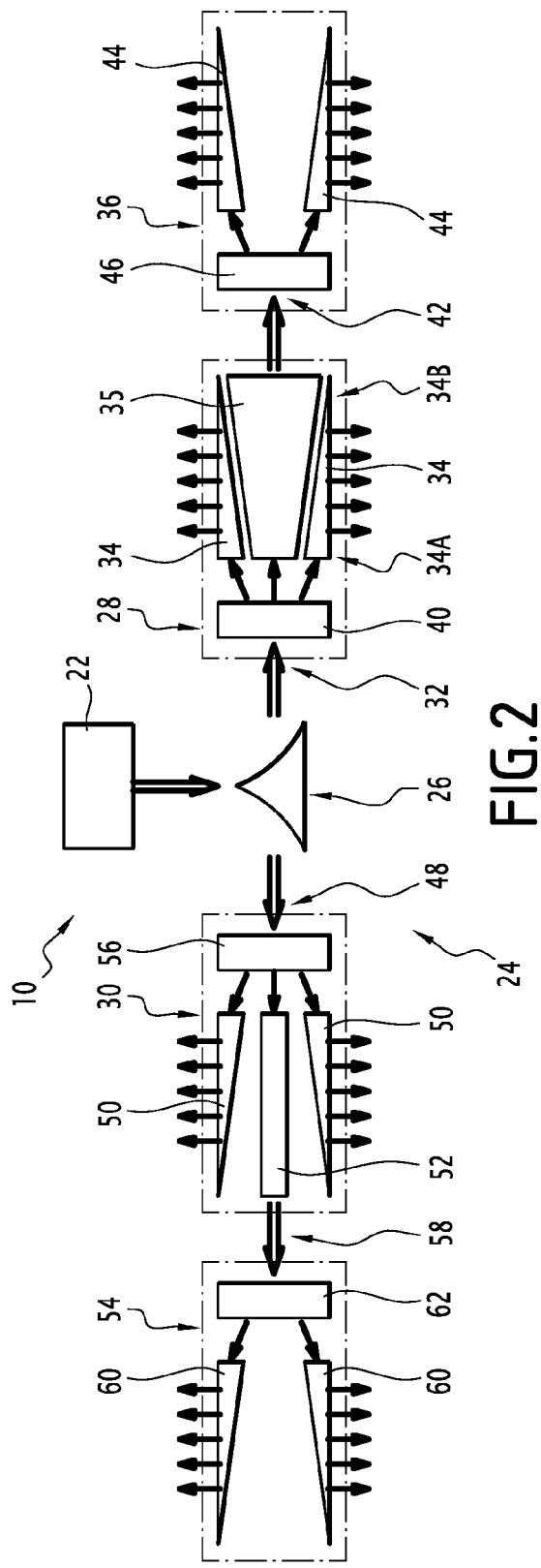

AIR-CONDITIONING DEVICE FOR A RAILWAY VEHICLE HAVING AT LEAST TWO CARRIAGES

The present invention relates to an air-conditioning device for a railway vehicle including at least two carriages. For example, this air-conditioning device is intended for fitting out a tram, a metro or a regional train.

A device for air conditioning of at least two adjacent carriages of a railway vehicle is known from the state of the art, comprising means for emitting an air-conditioned flow of air (e.g. a duct) and a network capable of circulating conditioned air from the emission means as far as compartment rooms laid out in the carriages.

Usually, the circulation network includes at least one conduit for distributing conditioned air extending over the whole of the carriages air-conditioned by this device. This distribution conduit includes several portions aligned in a predetermined order, each portion being laid out in a distinct carriage. In other words, the carriages should also be aligned in a predetermined order. Thus, it is difficult to modify the configuration of the railway vehicle, since addition, withdrawal or replacement of carriages requires a complete rearrangement of the air conditioning device.

The object of the invention is notably to find a remedy to this drawback, by providing a modular air-conditioning device, allowing easy modification of the configuration of the railway vehicle.

For this purpose, the object of the invention is notably a device for air-conditioning at least two adjacent carriages of a railway vehicle, comprising means for emitting a flow of conditioned air and a network for circulating conditioned air, characterizing that the circulation network at least includes one first circuit for circulating conditioned air intended to fit out a first carriage, said first circulation circuit including:
- a first conditioned air inlet, through which passes an airflow from emission means,
- at least one first conduit for distributing conditioned air to the compartment room of said first carriage, extending from an upstream end, communicating with the air inlet, as far as a closed downstream end, the upstream and downstream ends both being intended to be laid out in said first carriage,
- at least a one first conduit for transferring conditioned air towards a second adjacent circuit for circulating conditioned air, said second circulation circuit being intended for fitting out a second carriage adjacent to the first,
- first means for distributing conditioned air from the air inlet, able to distribute the entering air flow between the distribution and transfer conduits.

It will be noted that only the distribution conduits carry out a distribution of conditioned air. Each transfer conduits only has a transfer function, and is therefore without any conditioned air outlet intended for a compartment room.

According to the invention, each carriage includes a complete distribution conduit which is specific to it. Thus, the distribution conduits of two adjacent carriages are independent.

In other words, the structure of the first circulation circuit does not depend on the configuration of the railway vehicle, since this structure is limited to said first carriage. Thus, addition or removal of a carriage does not have any impact on the structure of the first circulation circuit.

Also it is possible to align several carriages, each equipped with a circulation circuit is similar to said first circuit, each other circuit being structurally independent of each other.

The air conditioning device according to the invention is therefore modular, so that it is possible to modify the configuration of the railway vehicle without making any major structural modification of the air-conditioning device.

An air-conditioning device according to the invention may further include one or several of the following features, taken alone or according to all technically conceivable combinations.

Each first distribution conduit includes a conditioned air outlet, including at least one air outflow orifice, the conditioned air outlet extending along the first distribution conduit, and each first distribution conduit has a variable cross-section, decreasing from the upstream end down to the downstream end.

The first circulation circuit includes a first central transfer conduit, and two first lateral distribution conduits laid out laterally on either side of the first transfer conduit.

The circulation network includes a second circulation circuit, intended for fitting out a second carriage including:
- a second conditioned air inlet, through which passes an entering airflow from the first air transfer conduit, and
- at least one first conduit for distributing conditioned air to a compartment room of said second carriage, the whole of the incoming airflow being distributed among the second distribution conduit(s).

The circulation network includes a deflector, laid out downstream from the airflow emission means, separating the airflow from the emission means into a first air flow directed towards said first circuit, and into a second airflow directed towards a third air circulation circuit.

Said third air circulation circuit is intended to fit out a third carriage, and includes:
- a third conditioned air inlet, through which passes an incoming airflow from the emission means,
- at least one third conduits for distributing conditioned air to a compartment of said third carriage,
- at least one third conduit for transferring conditioned air to a fourth adjacent conditioned air circulation circuit, and
- third means for distributing conditioned air from the third air inlet, able to distribute the incoming airflow among the third distribution and transfer conduits.

The invention also relates to a railway vehicle, including at least two adjacent carriages, characterized in that it includes an air-conditioning device as defined earlier.

Advantageously, a railway vehicle according to the invention may include either one of the following features, taken alone or as a combination.

The vehicle includes a first carriage, in which is laid out the first circulation circuit, and a second carriage, adjacent to the first carriage, in which is laid out the second circulation circuit.

The vehicle includes a third carriage, adjacent to the first carriage, in which is laid out said third circulation circuit.

The invention will be better understood upon reading the description which follows, only given as an example and made with reference to the appended drawings, wherein:

FIG. 1 is a top view of a railway vehicle, as seen from above with partial transparency, equipped with an air-conditioning device according to an exemplary embodiment of the invention;

FIG. 2 schematically illustrates the air-conditioning device fitting out the railway vehicle of FIG. 1.

A railway vehicle 12 is illustrated in FIG. 1, and more particularly several carriages of this railway vehicle 12 have been illustrated, i.e. a first carriage 14, a second carriage 16, for example a driving carriage, adjacent to said first carriage and a third carriage 18 adjacent to the first carriage 14, as well as a fourth carriage 20 adjacent to the third carriage 18. The fourth carriage 20 is partly illustrated in FIG. 1, this fourth carriage 20 being cut by a central transverse plane P.

The railway vehicle 12 is equipped with an air-conditioning device 10, intended for air-conditioning of the first 14, second 16 and third 18 carriages, as well as one half of the fourth carriage 20, which is half-illustrated in FIG. 1. The railway vehicle 12 may for example include other carriages not shown, air-conditioned by means of another air-conditioning device positioned symmetrically to the one illustrated in FIG. 1, the symmetry being considered with respect to the plane P.

Each carriage 14, 16, 18, 20 includes at least one compartment room, at least one compartment room for passengers or an engine room. Advantageously the compartment rooms of these carriages communicate with each other.

The air-conditioning device 10, illustrated in more detail in FIG. 2, includes means 22 for emitting a conditioned air flow, and a network 24 for circulating the conditioned air, transporting the conditioned air from the emission means 22 as far as the compartment rooms of different carriages of the railway vehicle 12.

According to the described embodiment, the emission means 22 are laid out on the first carriage 14. The circulation network 24 includes a deflector 26 of the standard type, laid out downstream from the airflow emission means 22, and also laid out on the first carriage 14.

This deflector 26 is intended to separate the airflow from the emission means 22, into a first air flow directed towards a first circuit 28 for circulating conditioned air and a second air flow directed towards another air circulation circuit 30. More particularly, said first circuit 28 fits out the first carriage 14, and said other circuit 30 fits out the third carriage 18.

The first circulation circuit 28 includes a conditioned air inlet 32, through which passes an incoming airflow from the emission means 22, and more particularly, in the described example, and corresponding to said first airflow from the deflector 26.

The first circulation circuit 28 moreover includes at least a one first conduit 34 for distributing conditioned air, intended for distributing the conditioned air to the compartment room of the first carriage 14. Each first air distribution conduit 34 extends from an upstream end 34A, communicating with the air inlet 32, as far as a closed downstream end 34B. Advantageously, each first air distribution conduit 34 extends longitudinally in the carriage, i.e. parallel to the longitudinal direction of the carriage, in order to carry out air distribution all along the carriage.

The upstream 34A and downstream 34B ends are both laid out in the carriage 14. Thus, the first conduit 34 entirely extends in the first carriage 14, and its structure therefore does not depend on the carriages adjacent to this first carriage 14.

Each first distribution conduit 34 includes a conditioned air outlet, comprising at least one air outflow orifice, the conditioned air outlet extending along the first distribution conduit 34. For example, the air outlet includes a slot or several parallel slots extending along the first distribution conduit 34, or a plurality of orifices, aligned along the first distribution conduit 34.

In the present description, the so-called "distribution" conduits are those having a function for distributing conditioned air. In other words, these are the only conduits provided with an air outlet intended for a compartment room.

The first circulation circuit 28 moreover includes a first conduit 35 for transferring air to an adjacent second circuit 36 for circulating conditioned air. This second circulation circuit 36 fits out the second carriage 16 adjacent to the first 14.

In the described example, the first transfer conduit 35 is laid out centrally on the first carriage 14. The first circulation circuit 28 then includes two first lateral distribution conduits 34 laid out laterally on either side of the first transfer conduit 35. The first lateral distribution conduits 34 extend parallel to the first transfer conduit 35.

For example, the first central transfer conduit 35 is separated from the first lateral distribution conduits 34 by partitions 38, for example metal partitions.

In the present description, the so-called "transfer" conduits are those only having an air transfer function. In other words, these transfer conduits are without any air outlet intended for a compartment room.

The first circulation circuit 28 finally includes first means 40 for distributing conditioned air from the air inlet 32, able to distribute this conditioned air among the first distribution conduits 34 and the first transfer conduit 35. Thus, the whole of the incoming airflow is distributed among the first distribution 34 and transfer 35 conduits.

More particularly, a rate $\beta$ of incoming airflow is directed towards the first distribution conduits 34, and a rate $1-\beta$ of the incoming airflow is directed towards the first transfer conduit 35. This airflow rate of $1-\beta$ is transmitted to the second air circulation circuit 36.

The rate $\beta$ is determined so as to obtain satisfactory conditioned air amounts, regardless of the configuration of the railway vehicle, notably when the first carriage 14 is an adjacent to the second carriage 16, or when an intermediate carriage is inserted between the first carriage 14 and the second carriage 16.

For example for an air flow rate of $Q=4,200$ m$^3$/h, the rate $\beta$ is selected to be equal to 55%.

Advantageously, each first distribution circuit 34 has a variable cross-section, and more particularly a cross-section which decreases from the upstream end 34A to the downstream end 34B. this reduction in the cross-section of the distribution conduit 34 gives the possibility of retaining a substantially constant conditioned air flow rate all along the conditioned air outlet. Indeed, as the conditioned air volume decreases along the distribution conduit 34, because the conditioned air flows out through the air outlet, the cross-section of this distribution conduit has to be reduced in order to retain than the flow rate.

In the illustrated example, the second circulation circuit 36 is an end circulation circuit, i.e. not including any conduit for transferring conditioned air towards another circuit. Indeed, the second carriage 16 is an end carriage so that the conditioned air is not transmitted to another carriage.

The second circulation circuit 36 includes a second conditioned air inlet 42, through which passes an incoming airflow from the first air transfer conduit 35, and at least one second conditioned air distribution conduit 44 towards a compartment room of the corresponding carriage 16. For example, the second circuit 36 includes two second distribution conduits 44, each extending entirely in the second carriage 16. These second distribution conduits 44 extend in a longitudinal direction of the carriage 16, in order to distribute the conditioned air or along this carriage 16.

The whole of the incoming airflow through the conditioned air inlet 42 is distributed among the second distribution conduits 44, through second distribution means 46.

Each second distribution conduit 44 includes a conditioned air outlet extending along this second distribution conduit 44, and advantageously has a variable cross-section over at least one portion of its length.

As mentioned previously, the conditioned air from the emission means 22 is partly diverted towards the first circulation circuit 28, i.e. towards the first 14 and second 16 carriages, and partly diverted towards another circuit 30, a so-called third circuit 30.

This third air circulation circuit 30 is intended to fit out the third carriage 18, and it is substantially similar to the first circulation circuit 28. In particular, it includes:

a third conditioned air inlet 48, through which passes an incoming airflow from the emission means 22, and more particularly a portion of the airflow diverted by the deflector 26, at least the one third conduit 50 distributing conditioned air towards a compartment room of the third carriage 18, extending along a longitudinal direction of the third carriage 18, at least one third conduit 52 for transferring condition air towards an adjacent fourth conditioned air circulation circuit 54, extending parallel to the third conduit 50, and third means 56 for distributing conditioned air from the air inlet 48, able to distribute the incoming airflow among the third distribution 50 and transfer 52 conduits.

Also, said fourth circulation circuit 54 is intended to fit out the fourth carriage 20, and it is for example similar to the second circulation circuit 36. In particular, it includes a fourth air inlet 58, through which passes an incoming airflow from the third air transfer conduit 52, and two fourth conduits 60 distributing conditioned air towards a compartment room of the carriage 20. The whole of the incoming airflow is distributed among the fourth distribution conduits 60, by fourth distribution means 62.

Advantageously, each of the first 40, second 46, third 56 and fourth 62 air distribution means includes means for varying the distribution of the air flows.

It will be noted that the invention is not limited to the embodiment described earlier, but may have diverse alternatives without departing from the scope of the claims.

In particular, provision may be made for a different layout of the circulation circuits. For example, another carriage provided with another circulation circuit similar to the first circulation circuit 28 may be inserted between the first carriage 14 and the second carriage 12. Indeed, the invention allows great modularity in the configuration of the railway vehicle 12.

The invention claimed is:

1. An air conditioning device for air-conditioning at least two adjacent carriages of a railway vehicle, comprising an emitter of a conditioned air flow and a circulation network for circulating the conditioned air flow, wherein the circulation network includes at least one first circulation circuit for circulating conditioned air flow, intended to fit out a first carriage, said first circulation circuit including:

a first conditioned air inlet, through which passes an incoming airflow from the emitter, at least one first distribution conduit for distributing conditioned air towards a first compartment room of said first carriage, extending from an upstream end, communicating with the first conditioned air inlet, as far as a closed downstream end, the upstream end and the downstream end being both intended for being laid out in said first carriage, at least one first transfer conduit for transferring conditioned air towards an adjacent second conditioned air circulation circuit, said second conditioned air circulation circuit being intended to fit out a second carriage adjacent to the first carriage, wherein each transfer conduit only has a transfer function, and is therefore without any conditioned air outlet intended for a compartment room, a first distributor for distributing conditioned air from the air inlet, able to distribute the incoming airflow among the first distribution conduit and the first transfer conduit.

2. The air-conditioning device according to claim 1, wherein:

each first distribution conduit includes a conditioned air outlet, including at least one air outflow orifice, the conditioned air outlet extending along the first distribution conduit, each first distribution conduit has a variable cross-section, decreasing from the upstream end to the downstream end.

3. The air-conditioning device according to claim 1, wherein the first circulation circuit includes a first central transfer conduit, and two first lateral distribution conduits laid out laterally on either side of the first transfer conduit.

4. The air-conditioning device according to claim 1, wherein the circulation network includes a second circulation circuit, intended for fitting out a second carriage, including:

a second conditioned air inlet, through which flows an incoming airflow from the first air transfer conduit, at least one second distribution conduit for distributing conditioned air towards a second compartment room of said second carriage, the whole of the incoming airflow being distributed among the second distribution conduit(s).

5. The air-conditioning device according to claim 1, wherein the circulation network includes a deflector, laid out downstream from the emitter emitting an airflow, separating the airflow from the emitter into a first airflow directed towards said first circulation circuit, and into a second airflow directed towards a third air circulation circuit.

6. The air-conditioning device according to claim 5, wherein said third air circulation circuit is intended to fit out a third carriage, and includes:

a third conditioned air inlet, through which passes an incoming airflow from the emitter, at least one third distribution conduit for distributing conditioned air towards a third compartment room of said third carriage, at least one third transfer conduit for transferring conditioned air towards an adjacent fourth conditioned air circulation circuit, a third distributor for distributing conditioned air from the third air inlet, able to distribute the incoming airflow among the third distribution conduit and the third transfer conduit.

7. A railway vehicle, including at least a first carriage and a second carriage adjacent to the first carriage, and including an air-conditioning device comprising an emitter of a conditioned air flow and a circulation network for circulating the conditioned air flow, wherein the circulation network includes at least one first circulation circuit for circulating conditioned air flow, fitting out the first carriage, said first circulation circuit including:
- a first conditioned air inlet, through which passes an incoming airflow from the emitter,
- at least one first distribution conduit for distributing conditioned air towards a first compartment room of said first carriage, extending from an upstream end, communicating with the first conditioned air inlet, as far as a closed downstream end, the upstream end and the downstream end being both intended for being laid out in said first carriage,
- at least one first transfer conduit for transferring conditioned air towards an adjacent second conditioned air circulation circuit, said second conditioned air circulation circuit fitting out the second carriage,
- a first distributor for distributing conditioned air from the air inlet, able to distribute the incoming airflow among the first distribution conduit and the first transfer conduit, the first distributor extending parallel to the first transfer conduit, and parallel to a longitudinal direction of the first carriage.

8. The railway vehicle according to claim 7, wherein the circulation network includes a second circulation circuit, fitting out the second carriage, including:
- a second conditioned air inlet, through which flows an incoming airflow from the first air transfer conduit,
- at least one second distribution conduit for distributing conditioned air towards a second compartment room of said second carriage, the whole of the incoming airflow being distributed among the second distribution conduit(s).

9. The railway vehicle according to claim 8, including a third carriage adjacent to the first carriage, and in which is laid out a third circulation circuit, wherein the circulation network includes a deflector, laid out downstream from the emitter emitting an airflow, separating the airflow from the emitter into a first airflow directed towards said first circulation circuit, and into a second airflow directed towards said third air circulation circuit.

10. The railway vehicle according to claim 9, wherein said third air circulation includes:
- a third conditioned air inlet, through which passes an incoming airflow from the emitter,
- at least one third distribution conduit for distributing conditioned air towards a third compartment room of said third carriage,
- at least one third transfer conduit for transferring conditioned air towards an adjacent fourth conditioned air circulation circuit,
- a third distributor for distributing conditioned air from the third air inlet, able to distribute the incoming airflow among the third distribution conduit and the third transfer conduit.

11. The railway vehicle according to claim 8, wherein:
- each first distribution conduit includes a conditioned air outlet, including at least one air outflow orifice, the conditioned air outlet extending along the first distribution conduit,
- each first distribution conduit has a variable cross-section, decreasing from the upstream end to the downstream end.

12. The railway vehicle according to claim 8, wherein the first circulation circuit includes a first central transfer conduit, and two first lateral distribution conduits laid out laterally on either side of the first transfer conduit.

* * * * *